(12) United States Patent
Liu

(10) Patent No.: US 10,965,830 B2
(45) Date of Patent: Mar. 30, 2021

(54) APPARATUS AND NON-TRANSITORY COMPUTER READABLE MEDIUM

(71) Applicant: FUJI XEROX CO., LTD., Tokyo (JP)

(72) Inventor: Binhui Liu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/775,713

(22) Filed: Jan. 29, 2020

(65) Prior Publication Data

US 2021/0067638 A1 Mar. 4, 2021

(30) Foreign Application Priority Data

Aug. 28, 2019 (JP) .............................. JP2019-155780

(51) Int. Cl.
| G06K 15/00 | (2006.01) |
| H04N 1/00 | (2006.01) |
| G06F 11/14 | (2006.01) |
| H04N 1/44 | (2006.01) |

(52) U.S. Cl.
CPC ....... *H04N 1/0097* (2013.01); *G06F 11/1456* (2013.01); *H04N 1/4433* (2013.01); *G06F 2201/805* (2013.01); *H04N 2201/0094* (2013.01)

(58) Field of Classification Search
CPC ............... H04N 1/0097; H04N 1/4433; H04N 2201/0094; G06F 11/1456; G06F 11/1451; G06F 11/1448; G06F 2201/805
See application file for complete search history.

(56) References Cited

U.S. PATENT DOCUMENTS

| 10,175,904 | B2 | 1/2019 | Tajima | |
| 2013/0173554 | A1* | 7/2013 | Ubukata | G06F 11/1448 707/640 |
| 2014/0126023 | A1* | 5/2014 | Funane | H04N 1/00278 358/1.16 |
| 2019/0320087 | A1* | 10/2019 | Shimotsu | H04N 1/32678 |

FOREIGN PATENT DOCUMENTS

JP 2018-007145 A 1/2018

* cited by examiner

*Primary Examiner* — Moustapha Diaby
(74) *Attorney, Agent, or Firm* — Oliff PLC

(57) ABSTRACT

An apparatus includes a generating and copy unit. The generating unit generates backup data including an information processing component, identification information of a save area among multiple save areas in the apparatus, and associated-user information. The information processing component is included in the apparatus. The save area associated with the information processing component. The associated-user information indicates a user associated with the save area. The copy unit copies the information processing component in the second backup data to the apparatus. If a user is associated with a save area among the multiple save areas in the apparatus and is indicated by the second backup data, the copy unit associates a save area with the information processing component copied in the apparatus. The associated save area is among the multiple save areas in the apparatus and is specified on the basis of the associated-user information included in the second backup data.

20 Claims, 10 Drawing Sheets

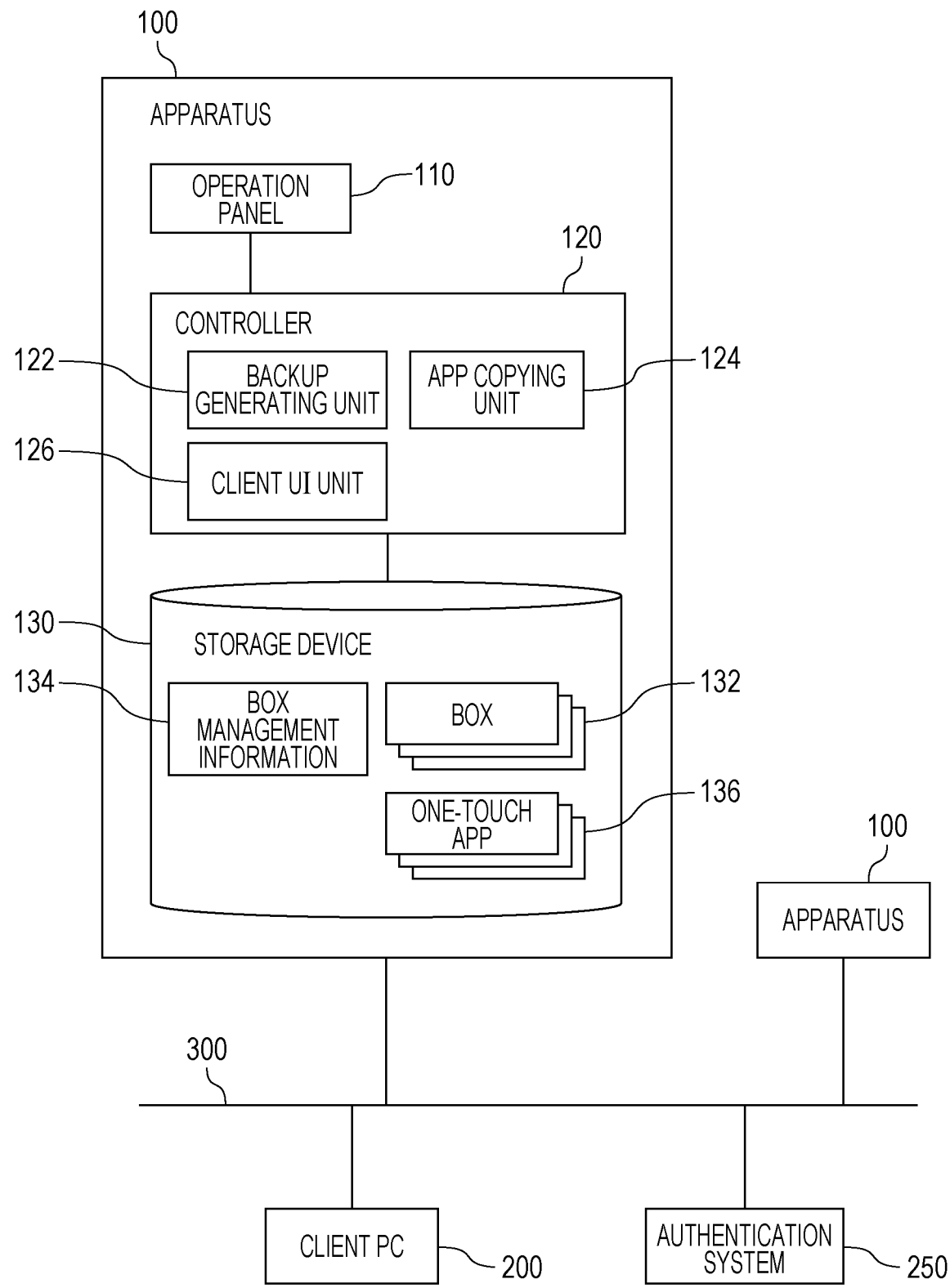

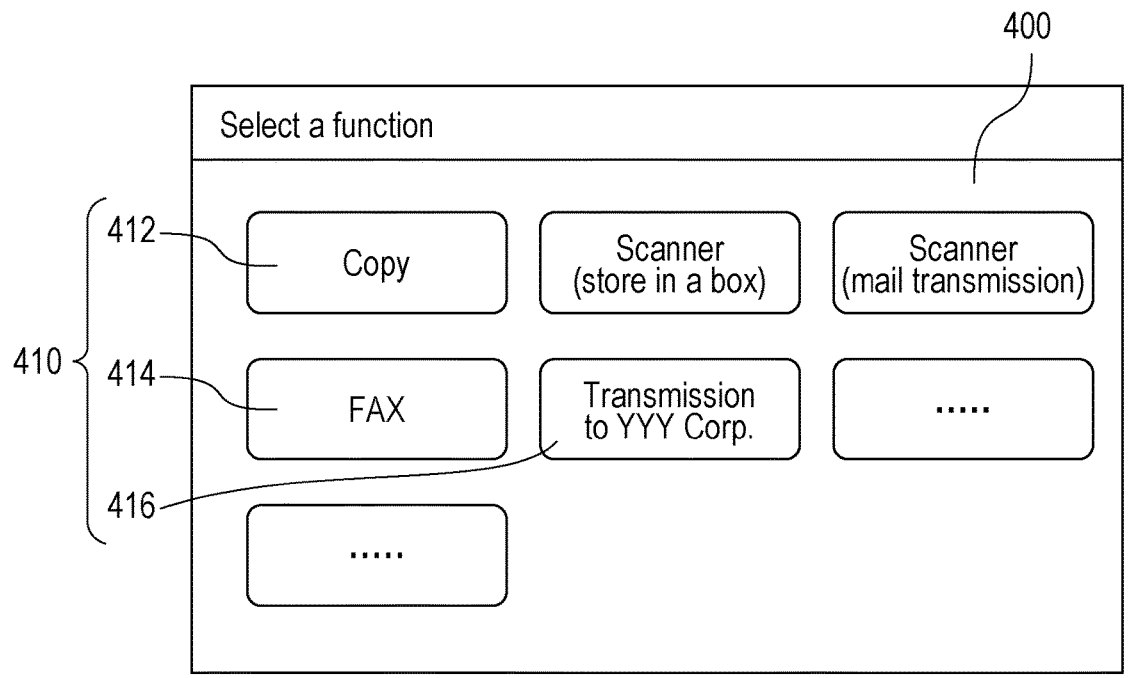

FIG. 4

| INSTRUCTION DESCRIPTION 001 | |
|---|---|
| ITEM NAME | CONTENT |
| NAME | FOR TRANSMISSION TO YYY CORP. |
| UPDATE DATE AND TIME | 2019/06/25 |
| OWNER | User003 |
| DESCRIPTION | FOR FAX TRANSMISSION TO YYY CORP. |
| HASH VALUE | 7ADBE391489ED2E........... |
| PROCESSING CONTENT | <CODES INDICATING PROCESSING CONTENT> |
| PROCESSING TYPE | FAX TRANSMISSION |
| FAX | 03-xxxx-yyyy |
| Mail | TRANSMISSION TO admin@example.com |
| FTP | NO |
| Print | NO |
| ...... | ...... |

APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-155780 filed Aug. 28, 2019.

BACKGROUND (i) Technical Field

The present disclosure relates to an apparatus and a non-transitory computer readable medium.

(ii) Related Art

The following technique is being used: apparatuses such as a multi-function device (an apparatus having a combination of the functions of a printer, a scanner, a fax, and the like) includes logical save areas, which are called, for example, confidential boxes or security boxes and in which fax data, scan data, print data, and the like are stored. Such save areas described above are prepared. Passwords and authorized users are set to the save areas, enabling users, who may access corresponding save areas, to be limited. In addition, the following mechanism is known: a save area such as a confidential box is associated with a type of program (also called an "instruction description" or a "job flow") defining procedures obtained by combining functions provided by an apparatus; a corresponding procedure is performed on data stored in the save area.

In addition, the following technique is being used: a save area is associated with a user who may access the save area. Such a user is called an owner, an access right holder, or the like of the save area.

Some of the apparatuses of such type receive registration of an information processing component such as a program defining a process associated with a save area, and perform the process corresponding to the information processing component in response to an instruction from a user.

For example, a save area is associated with an information processing component to serve as a storage destination of result data from the process defined by the information processing component. In addition, the information processing component indicates a program, setting information, or the like defining part or all of the processing content. For example, an information processing component defines a process of storing, in a specific save area, scan data obtained through scanning using a scanner included in the apparatus. The information processing component includes, for example, information indicating "scan" which indicates the process type, parameters of a scan process (for example, parameters indicating a resolution and the like), and identification information of a save area in which scan data obtained through the scan process is stored.

In addition, there is an apparatus in which a user may register an information processing component, which is specific to the user and which indicates the processing content defined freely in a given (that is, predetermined) range.

Japanese Unexamined Patent Application Publication No. 2018-007145 describes a technique of the related art about a save area included in an apparatus. The apparatus disclosed in Japanese Unexamined Patent Application Publication No. 2018-007145 provides a box setting screen for setting a confidential box (an exemplary save area) which serves as a temporary storage destination of received fax data for paperless fax transfer. An automatic-input button is provided in the box setting screen. When a user, who inputs settings, presses the automatic-input button, the controller of the apparatus finds the largest box number among the "unregistered" box numbers from box management information, and sets the found box number in the number input field. Thus, the confidential box having the box number, which has been unregistered, is set as a confidential box used in the paperless fax transfer applied to faxes through a certain line.

For example, as in the case in which a certain apparatus is replaced with a new apparatus, it may be convenient that an information processing component registered in a first apparatus is copied to a second apparatus which is different from the first apparatus. If the information processing component associated with the save area corresponding to certain identification information (which is referred to as first identification information) in the first apparatus is simply copied to the second apparatus, the information processing component is associated with a save area, in the second apparatus, corresponding to the same first identification information. This may cause the following case to arise: the user associated with the save area, in the second apparatus, corresponding to the first identification information is different from the user (who is referred to as a first user) associated with the save area, in the first apparatus, corresponding to the first identification information. In this case, if the first user, who has used the information processing component using their save area which is included in the first apparatus and which corresponds to the first identification information, performs the process for the information processing component copied to the second apparatus, the process is performed by using a different user's save area corresponding to the same first identification information. Therefore, a state, which is not expected by the first user, may occur through execution of the information processing component in the second apparatus.

SUMMARY

Aspects of non-limiting embodiments of the present disclosure relate to a mechanism for preventing the following state from occurring: an information processing component, having been copied from a first apparatus to a second apparatus, is associated with a save area associated with a different user in the second apparatus. The different user is other than a user who is associated with the associated save area in the first apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an apparatus including a generating unit and a copy unit. The generating unit generates backup data including an information processing component, identification information of a save area among multiple save areas in the apparatus, and associated-user information. The information processing component is included in the apparatus. The save area is associated with the information processing component. The associated-user information indicates a user associated with the save area. If second backup data generated by the generating unit of a different apparatus is received, the copy unit copies the information processing component in the second backup data to the apparatus. If a user is associated with a save area which is among the multiple save areas in the apparatus and which is indicated by the identification information included in the second backup data, the copy unit associates a save area with the information processing component copied in the apparatus. The associated save area is among the multiple save areas in the apparatus and is specified on the basis of the associated-user information included in the second backup data.

BRIEF DESCRIPTION OF THE DRAWINGS

Exemplary embodiment of the present disclosure will be described in detail based on the following figures, wherein:

FIG. 1 is a diagram illustrating an exemplary system according to the exemplary embodiment;

FIG. 2 is a schematic diagram illustrating a user interface (UI) screen example of an apparatus;

FIG. 3 is a diagram illustrating exemplary data of box management information;

FIG. 4 is a diagram illustrating exemplary data of an instruction description;

DETAILED DESCRIPTION

Exemplary System Configuration

Figure 5:
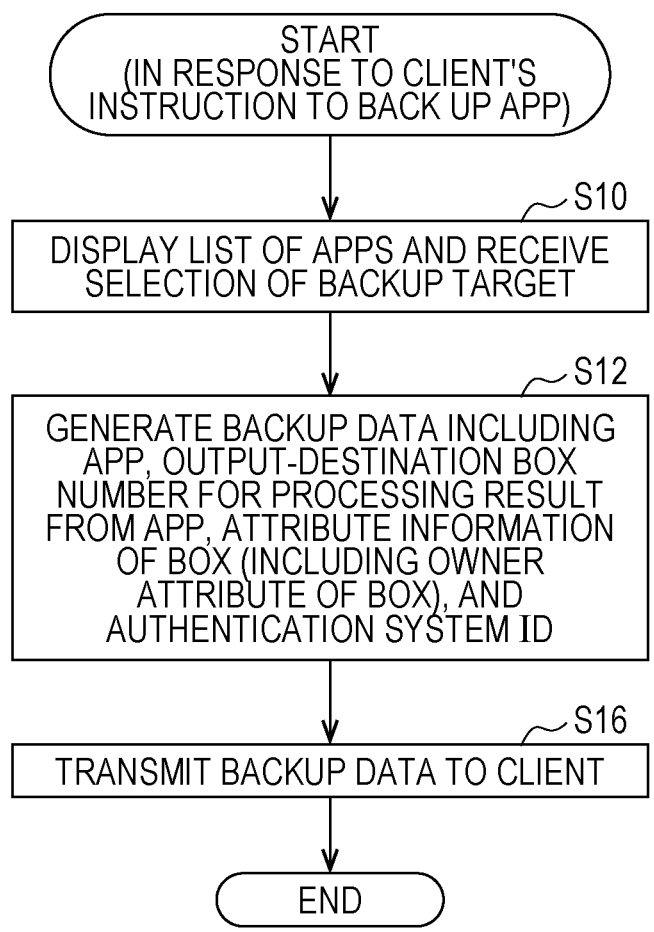
FIG. 5 is a diagram illustrating an exemplary procedure of a backup generating unit in an apparatus according to the exemplary embodiment.

FIG. 1 illustrates an exemplary system configuration according to the present exemplary embodiment. The system includes apparatuses 100, a client personal computer (PC) 200, and an authentication system 250 which are connected to a network 300 such as a local area network.

The client PC 200 is a PC used by a user when the user copies a one-touch app between apparatuses 100. The authentication system 250 authenticates a user who is going to use an apparatus 100. Multiple different authentication systems 250 may be present on the network 300. An apparatus 100 including the authentication system 250 embedded therein may be present. Each apparatus 100 on the network 300 has a setting indicating which authentication system 250 is used by the apparatus 100 for user authentication.

Each apparatus 100 includes an operation panel 110, a controller 120, and a storage device 130.

The operation panel 110 includes, for example, an input/output apparatus having a graphical user interface, such as a touch-panel display apparatus. The operation panel 110 displays a user interface (UI) screen to a user, and receives operation input on the UI screen from the user. In addition, the operation panel 110 may include input apparatuses other than a display apparatus, such as a start button for giving an instruction to start execution of a process and a numeric keypad for inputting a numeric.

The controller 120, which performs the information processing function provided by the apparatus 100, includes hardware for the information processing function, that is, for example, a processor such as a central processing unit (CPU) and a memory as a primary memory. The controller 120 includes programs, such as an operating system (OS), firmware, and various application programs, which are executed by using the hardware. A backup generating unit 122, an app copying unit 124, and a client UI unit 126 which are illustrated in the controller 120 are functions implemented by executing programs. These functions will be described below.

The storage device 130 is a secondary storage device, that is, a device which semi-permanently stores data (that is, which continues to store data as long as no explicit delete instructions are given). The storage device 130 is, for example, a disk device (for example, a hardware disk or a solid-state disk). The storage device 130 is managed, for example, by an OS file system of the controller 120. The storage device 130 stores data, such as box management information 134 and one-touch apps 136. The storage device 130 may include one or more boxes 132 which are exemplary save areas described below. The boxes 132 may be implemented, for example, as folders in a file system.

Schematically, each apparatus 100 has the information processing function for executing computer programs. The controller 120 is a unit performing the information processing function of the apparatus 100.

In addition, the apparatus 100 may have hardware for performing functions other than the information processing function, such as a print mechanism, a scan mechanism, a facsimile reception/transmission mechanism, and a network communication device. An image processing apparatus such as a multi-function device is an exemplary apparatus 100.

The apparatus 100 has one or more logical save areas for storing data such as files. There are some multi-function devices, as exemplary apparatuses 100, which have a configuration in which one or more save areas called confidential boxes, security boxes, or the like may be set. In the example in FIG. 1, such save areas are illustrated as the boxes 132. The boxes 132 may store various data, such as scan image data obtained through the scan function, data obtained by processing scan image data, facsimile data received through the facsimile function, and electronic mail received by using the mail reception function of the apparatus 100.

A save area in the apparatus 100 may be associated with, that is, may be set to, a user who is capable of accessing the save area. Herein, such a user is called an owner of the save area.

The save areas in the apparatus 100 may be associated individually with processes which are applied to the data stored in the save areas. The process associated with a save area is applied to, that is, is performed on, the data stored in the save area.

There are multiple types of process applied to data stored in a save area: a process defined as a function provided by the apparatus 100 and as setting information for the function (for example, various parameters); a process defined as a program executed by the information processing function.

An example of the former is a print process or a facsimile transmission process. In the print process, a print density, the print mode (that is, the mode for specifying monochrome print or full color print), and the like are specified as setting information. In the facsimile transmission process, a destination FAX number is specified as setting information. In this example, as information indicating a process applied to the data stored in a save area, information is registered in the apparatus 100 in association with the save area. The registered information includes identification information (for example, identification information indicating the print function) of the function, which is used for the process, of the apparatus 100, and setting information (for example, a set of the print density and the print mode) applied to the function.

In the latter case, that is, the case in which a process applied to the data stored in a save area is defined as a program, a user may create the program defining the process, and may associate (that is, may set) the created program, serving as the information defining the process, with the save area. Alternatively, a user may select one of the existing programs prepared in the apparatus 100, and may input data for user-customizable parts (for example, setting information such as parameters) in the program. In this way, the user may create information defining the process, and may associate the information with the save area. The information includes, for example, information for specifying the existing program selected by the user and data which is input by the user for individual customizable parts in the program.

The information, which thus defines the process applied to the data stored in a save area, may be configured as data called an instruction description or a job flow as in the example described below. The instruction description is data defining the process executable by using one or more functions provided by the apparatus 100. The functions provided by the apparatus 100 include a function implemented through information processing performed by the controller 120, a function implemented by using a hardware mechanism, such as a scanner or a printer, included in the apparatus 100, and a function implemented through a combination of the information processing of the controller 120 and a hardware mechanism such as a scanner. There are multiple types of process defined by using an instruction description: a process defined by using a function provided by the apparatus 100 and setting information for the function; a process defined as a program executed by the information processing function of the apparatus 100. Information such as an instruction description defining a process applied to the data stored in a save area is installed, for example, in the storage device 130 of the apparatus 100.

In the apparatus 100, an information processing component may be registered. The information processing component is data for defining a process executable by using one or more functions provided by the apparatus 100. There are multiple types of process defined by an information processing component: a process defined by using a function provided by the apparatus 100 and setting information (for example, various parameters) for the function; a process defined as a program executed by the information processing function of the apparatus 100. An example of the former is a specific scan process defined by using a set of the scan function and scan setting information (for example, a scan resolution). An example of the latter is a process in which the scan function is operated to obtain scan image data which is stored in a specific save area.

In an example of the former, an information processing component includes information indicating identification information of a function, which is used for the process, of the apparatus 100, and setting information for the function.

In an example of the latter, a user may create a program defining the process, and may register the created program as an information processing component in the apparatus 100. Alternatively, the user may select one of the existing programs prepared in the apparatus 100, and may input data for user-customizable parts (for example, setting information such as parameters) in the program. In this way, the user may create an information processing component which is registered in the apparatus 100. In this case, an information processing component includes, for example, information for specifying the existing program selected by the user, and data which is input by the user for individual customizable parts in the program.

An information processing component described as an example may be created, for example, as data called an instruction description or a job flow.

For example, when a user gives an explicit instruction to execute an information processing component, or when an execution condition, which is set in advance in the apparatus 100, for the information processing component is satisfied, the process defined by the information processing component is executed by the apparatus 100. When the information processing component includes a program defining the processing content, the program is executed by the information processing function of the apparatus 100. To receive an instruction to execute an information processing component from a user, an icon indicating the information processing component may be displayed in the UI screen displayed on the operation panel 110 or the like of the apparatus 100. In this case, when a user selects the icon of the information processing component on the UI screen and performs an operation of giving an execution instruction, the process defined by the information processing component is performed.

When the process defined by the information processing component outputs its processing result as electronic data (hereinafter referred to as processing result data), information defining the output destination of the processing result data is included in the information processing component. A save area such as a confidential box may be selected as the output destination of the processing result data. In this case, the information processing component includes identification information for uniquely identifying the save area (that is, a box 132 in the example in FIG. 1) serving as the output destination of the processing result data.

The identification information of the save area is not unique globally, and is unique among the save areas included in a single apparatus 100. Thus, if an information processing component, in which the save area corresponding to certain identification information (which is referred to as first identification information) in a first apparatus 100 is used as the output destination of the processing result, is simply copied to a second apparatus 100, a processing result of the information processing component in the second apparatus 100 is output to the save area, which corresponds to the same first identification information, in the second apparatus 100.

In the example in FIG. 1, the one-touch apps 136, which are exemplary information processing components, are installed in an apparatus 100. The one-touch apps 136 are stored in the storage device 130 in the apparatus 100. In the UI screen displayed on the operation panel 110, the icons for the one-touch apps 136 are displayed.

For example, in a UI screen 400 of the apparatus 100 illustrated in FIG. 2, icons 410 indicating buttons for calling the processing functions provided by the apparatus 100 are arranged in a matrix. When the processing functions are too many to be displayed in a single screen, other icons 410 are displayed in a different screen display area displayed through scrolling or paging-down. The icons 410 displayed in the UI screen 400 include icons corresponding to factory-installed native functions provided by the apparatus 100, such as a copy button 412 and a FAX transmission button 414. The icons 410 may include icons 416 for one-touch apps 136. A one-touch app 136 is software indicating, for example, a function implemented through various types of information processing performed by the controller 120, or a combinational function obtained by combining one or more native functions of the apparatus 100 with information processing. For example, the one-touch app 136 indicated by the "Transmission to YYY Corp." icon 416 illustrated in FIG. 2 is software indicating a function in which an image, which is read by using the scan function provided by the apparatus 100, is faxed to the FAX number of YYY Corp. by using the FAX reception/transmission function provided by the controller 120. A user may create data of a one-touch app 136, which defines the processing content desired by the user, for installation in the apparatus 100.

When a user presses an icon 416 on the UI screen 400 through a touch operation or the like, the one-touch app 136 corresponding to the icon 416 is executed by the controller 120.

The one-touch apps 136 installed in the apparatus 100 include an app in which any of the boxes 132 is assigned as the output destination of the processing result data obtained through execution of the one-touch app 136. Such a one-touch app 136 includes identification information of the box 132 assigned as the output destination.

The box management information 134 is information which is used to manage the boxes 132 and which is included in the storage device 130 of the apparatus 100. The boxes 132 are exemplary save areas in the apparatus 100. FIG. 3 illustrates exemplary data of the box management information 134. The box management information illustrated in FIG. 3 includes fields for each box 132, such as the box number field, the owner field, the instruction description field, the network number field, and the automatic deletion field. Among these fields, the box number field indicates identification information of the corresponding box 132, and the owner field and its subsequent fields indicate attributes of the corresponding box 132.

In the box number field, the box number which is exemplary identification information of the corresponding box 132 is registered. The box number indicates serial numbers assigned to the boxes 132 in the apparatus 100, and is exemplary identification information of a save area. The identification information of a save area is not limited to information in the numeric format, for example, the box number. The identification information of a save area may be in any format as long as the identification information has information with which the save area may be identified uniquely among the save areas in the apparatus 100.

In the owner field, identification information (hereinafter also referred to as a user ID) of a user who has access rights to the corresponding box 132 is registered. Multiple owners may be registered for a box 132. When a box 132 is set so as to be permitted to be used by any one, the owner field of the box 132 indicates, for example, "anyone" or a blank field. The user ID indicated in the owner field, which is an attribute item of a box 132, is exemplary "associated-user information indicating a user associated with a save area".

In the instruction description field, information for specifying the instruction description applied to the data stored in the corresponding box 132 (for example, identification information indicating the instruction-description data body stored in the storage device 130) is registered. The instruction description is data for defining a process performed by the apparatus 100. The box management information 134 may include an attribute item (not illustrated) indicating whether or not the association between the instruction description indicated in the instruction description field and the corresponding box 132 is in the automatic execution mode. The instruction description associated with a box 132 in the automatic execution mode is performed automatically when data is stored in the box 132. In contrast, the instruction description associated with a box 132 with the automatic execution mode made inactive is not performed when data is simply stored in the box 132, and is performed only after reception of a user's explicit execution instruction.

The data stored in a box 132 is subjected to the process defined by the instruction description indicated in the instruction description field corresponding to the box 132 (hereinafter also referred to as "the instruction description corresponding to a box 132"). Whether the instruction description corresponding to a box 132 is automatically applied to the data stored in the box 132, or the instruction description is applied in response to an instruction from a user is settable. When the latter is set, only storage of data in a box 132 does not cause the instruction description corresponding to the box 132 to be applied to the data. In this case, a user selects the data in the box 132, and gives an instruction to perform the instruction description. Only after these operations, the instruction description is applied to the data. In the former case, that is, in the case where the setting for automatically applying the instruction description corresponding to a box 132 has been set for the box 132, storage of data in the box 132 causes the instruction description to be automatically applied to the data. Application of an instruction description to data indicates execution of the process, which is defined by the instruction description, on the data.

In the network number field, the numbers of the networks, through which the corresponding box 132 may be used, among one or more networks connected to the apparatus 100 having the box 132 are registered. Network numbers are numbers for identifying the one or more networks individually. The box 132 may be accessed only through the networks indicated in the network number field.

In the automatic deletion field, whether or not the data stored in the corresponding box 132 is to be automatically deleted is registered. In the case where the value of this field is "yes", the data stored in the box 132 is deleted from the box 132 when a given condition (for example, a condition that a certain time period has elapsed from the time point of storage) is satisfied.

The owner, instruction description, and network number attributes among the attribute items of a box 132 illustrated in FIG. 3 are classified as required attributes. The required attributes are attributes, which need to match between a copy-source apparatus 100 and a copy-destination apparatus 100 with respect to a one-touch app 136, among the attributes of the output-destination box 132 for the processing result of the one-touch app 136. In contrast, the automatic deletion attribute is not a required attribute.

FIG. 4 illustrates exemplary data included in an instruction description. The illustrated instruction description includes items, such as "Name", "Update date and time", "Owner", "Description", "Hash value", "Processing content", "Processing type", "FAX", "Mail", "FTP", and "Print". "Name" indicates the name of the instruction description, and is given, for example, by a creator of the instruction description (that is, the owner of the instruction description). "Update date and time" indicates the latest update date and time of the instruction description. In the item "Owner", the user ID of the owner of the instruction description is registered. In the item "Description", a description for users about the processing content and the like of the instruction description is registered. In the item "Hash value", the hash value of the data included in the item "Processing content", which is described below, is registered.

In the item "Processing content", data indicating the content of the process defined by the instruction description, such as a program describing the processing content or a set of a function specifying the processing content and setting information, is registered. "Hash value" described above indicates a hash value of the data of "Processing content". In the case where "Processing content" is described by using a program, for example, the program may be described by using a script language, or may be executable binary codes.

The item "Processing type" indicates the type of the process indicated by the item "Processing content". In the illustrated example, the type of the processing content is FAX transmission.

In the item "FAX", the FAX number of a transmission destination is registered when "Processing content" defined by the instruction description involves FAX (that is, facsimile) transmission. In the item "Mail", the electronic mail address of a transmission destination, to which an output image (such as a printed image or an image transmitted through FAX) obtained through the processing of "Processing content" defined by the instruction description is transmitted, is registered. This example assumes that an image transmitted through FAX is transmitted to a manager who manages the task (for example, for an audit performed later). In the item "Mail", the mail address of the manager is registered. In the item "FTP", the URL indicating a transfer destination is registered when "Processing content" defined by the instruction description involves a process of, for example, transferring the processing result data to a remote server or the like through file transfer protocol (FTP). In the item "Print", print setting information or the like of an image is registered when "Processing content" defined by the instruction description involves printing the image obtained through the processing.

The Mechanism for Copying a One-Touch App

An apparatus 100 includes, as functional modules for copying a one-touch app, the backup generating unit 122, the app copying unit 124, and the client UI unit 126 in the controller 120.

The backup generating unit 122 generates backup data of a one-touch app 136 in the storage device 130 in response to an instruction from a user. The backup data generated by the backup generating unit 122 includes, in addition to the data about the one-touch app 136 itself, information indicating the user ID of the owner of the output-destination box 132 for the processing result of the one-touch app 136. This information is called an owner attribute. The data about the one-touch app 136 itself included in the backup data includes identification information (for example, the box number) of the output-destination box 132 for the processing result of the one-touch app 136.

If the output destination for the processing result of the one-touch app 136 that is to be backed up is not a box, the backup data does not include the owner attribute.

In this example, a one-touch app 136 is an exemplary information processing component, and a box 132 is an exemplary save area. The owner attribute of a box 132 is exemplary associated-user information indicating a user associated with a save area. The backup generating unit 122 is an exemplary generating unit.

The app copying unit 124 receives backup data which is input from a user, and copies the one-touch app 136, which is included in the backup data, to the storage device 130 of the apparatus thereof. The input backup data is generated by the backup generating unit 122 of a different apparatus 100 (hereinafter referred to as a "copy-source apparatus"). In the one-touch app 136, the box number of the box 132 which is the output destination for the processing result of the app is set. If the owner of the box 132 indicated by the box number is different between the copy-source apparatus 100 and the copy-destination apparatus 100, a problem related to information security may arise. Therefore, the app copying unit 124 determines whether or not the owner of the output-destination box 132 for the processing result of the one-touch app 136 in the backup data matches between the copy-source apparatus 100 and the apparatus 100 (that is, the apparatus 100 including the app copying unit 124). If the owner does not match, a different box 132 in the apparatus 100 is assigned to the one-touch app 136 as the output destination for the processing result.

The client UI unit 126 provides a UI screen for operations of the apparatus 100, over the network 300 to the client PC 200. The client UI unit 126 particularly provides a UI screen for the process of backing up a one-touch app 136 or for the process of copying backup data generated by the copy-source apparatus. A UI screen is provided, for example, by using a web technique.

FIG. 5 illustrates a procedure performed by the backup generating unit 122.

When a user accesses the client UI unit 126 of an apparatus 100 from the client PC 200, the client UI unit 126 provides a menu screen to the client PC 200. The menu screen includes "Back up a one-touch app" as one menu item. When the user gives an instruction to execute the menu item, the procedure illustrated in FIG. 5 is performed.

In the procedure, the client UI unit 126 provides a selection screen, in which a list of the one-touch apps 136 installed in the storage device 130 of the apparatus 100 is displayed, to the client PC 200. Then, the client UI unit 126 receives, from the user, selection of a one-touch app 136 that is to be backed up (S10).

When the user selects a one-touch app 136, which is to be backed up, on the selection screen, the client PC 200 transmits the selection result to the client UI unit 126. The backup generating unit 122 receives the selection result from the client UI unit 126, and analyzes the data about the processing content of the one-touch app 136 indicated by the selection result. In this analysis, it is checked whether or not an output-destination box 132 for the processing result data has been assigned in the one-touch app 136. That is, it is checked whether or not data about the processing content of the one-touch app 136 includes the box number of the output-destination box 132 for the processing result data of the one-touch app 136. When an output-destination box 132 for the processing result data has been assigned in the one-touch app 136, the backup generating unit 122 obtains attribute information of the box 132 from the box management information (see FIG. 3).

The backup generating unit 122 uses the analysis result to generate backup data (S12). The backup data includes data about the one-touch app 136 that is to be backed up, the box number of the output-destination box 132 for the processing result of the one-touch app 136, attribute information of the box 132, and the ID (identification information) of an authentication system. The box 132, which corresponds to the box number, in the copy-source apparatus 100 is called a "copy-source box 132". The attribute information of the box 132 included in the backup data includes the owner attribute of the copy-source box 132. The ID of the authentication system is identification information of the authentication system 250 used by the copy-source apparatus 100 in user authentication.

The backup generating unit 122 transmits a file of the generated backup data to the client PC 200 (S16).

Figure 6:
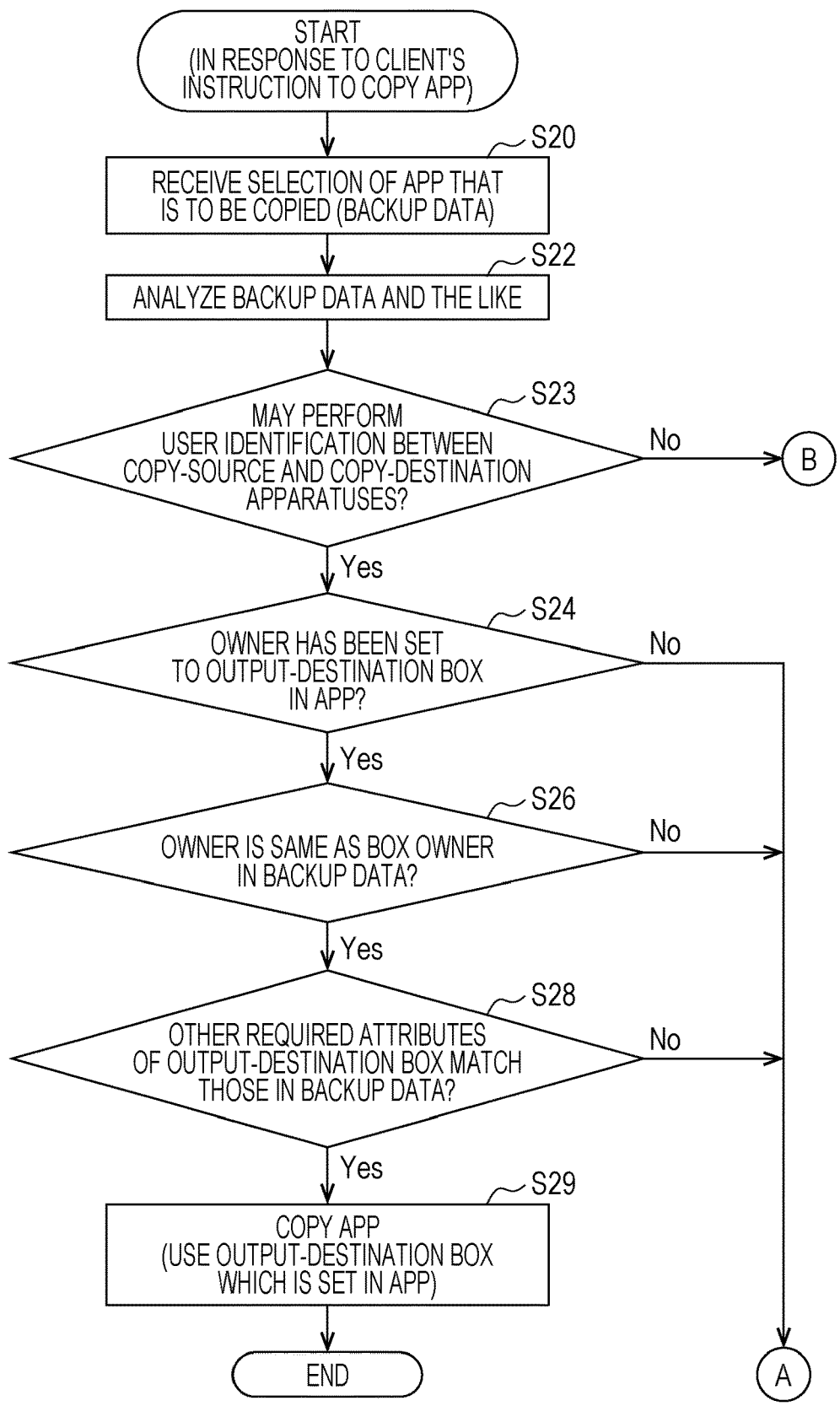
FIG. 6 is a diagram illustrating a part of an exemplary procedure of an app copying unit in an apparatus according to the exemplary embodiment.
Figure 7:
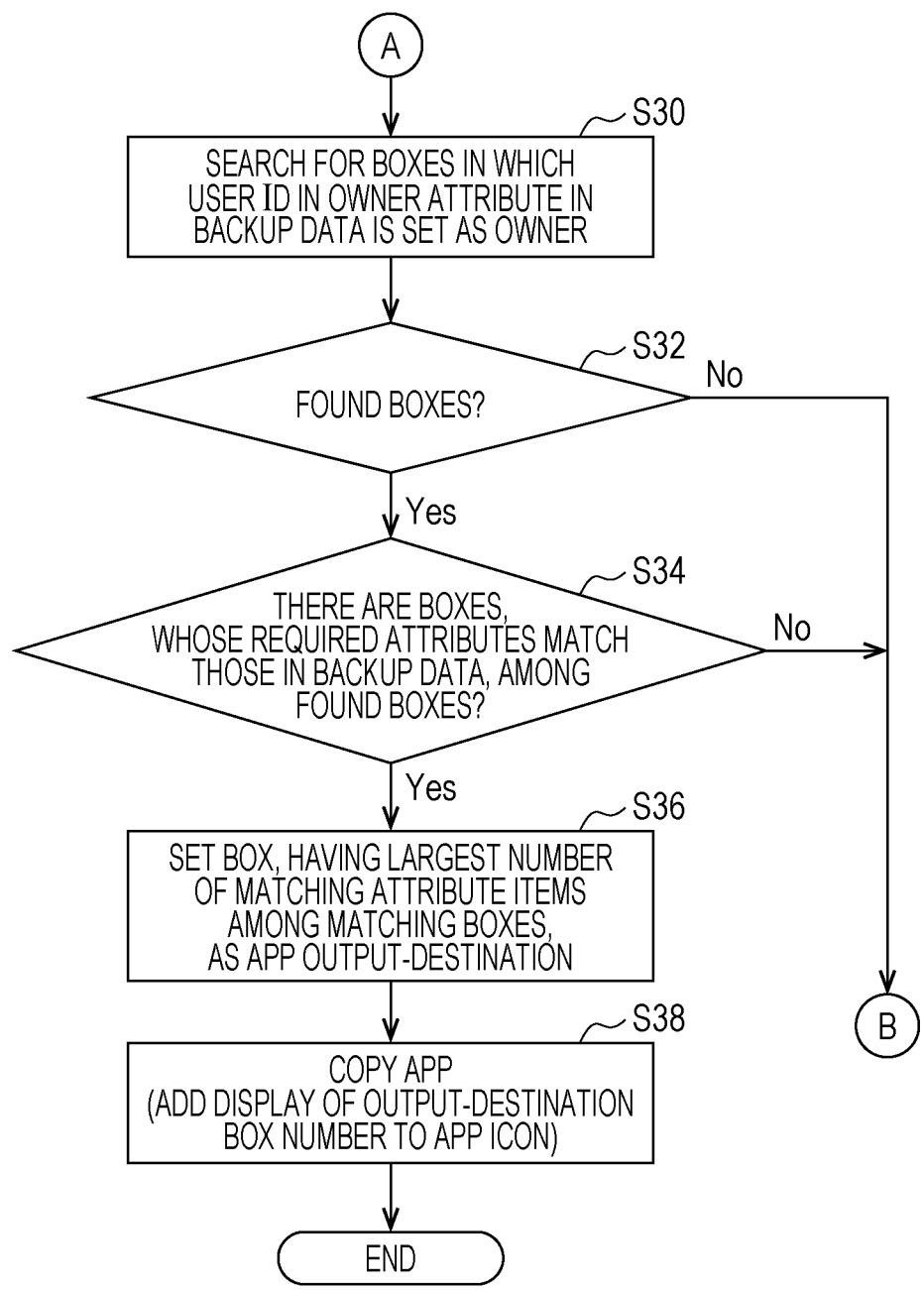
FIG. 7 is a diagram illustrating another part of an exemplary procedure of an app copying unit in an apparatus according to the exemplary embodiment.
Figure 8:
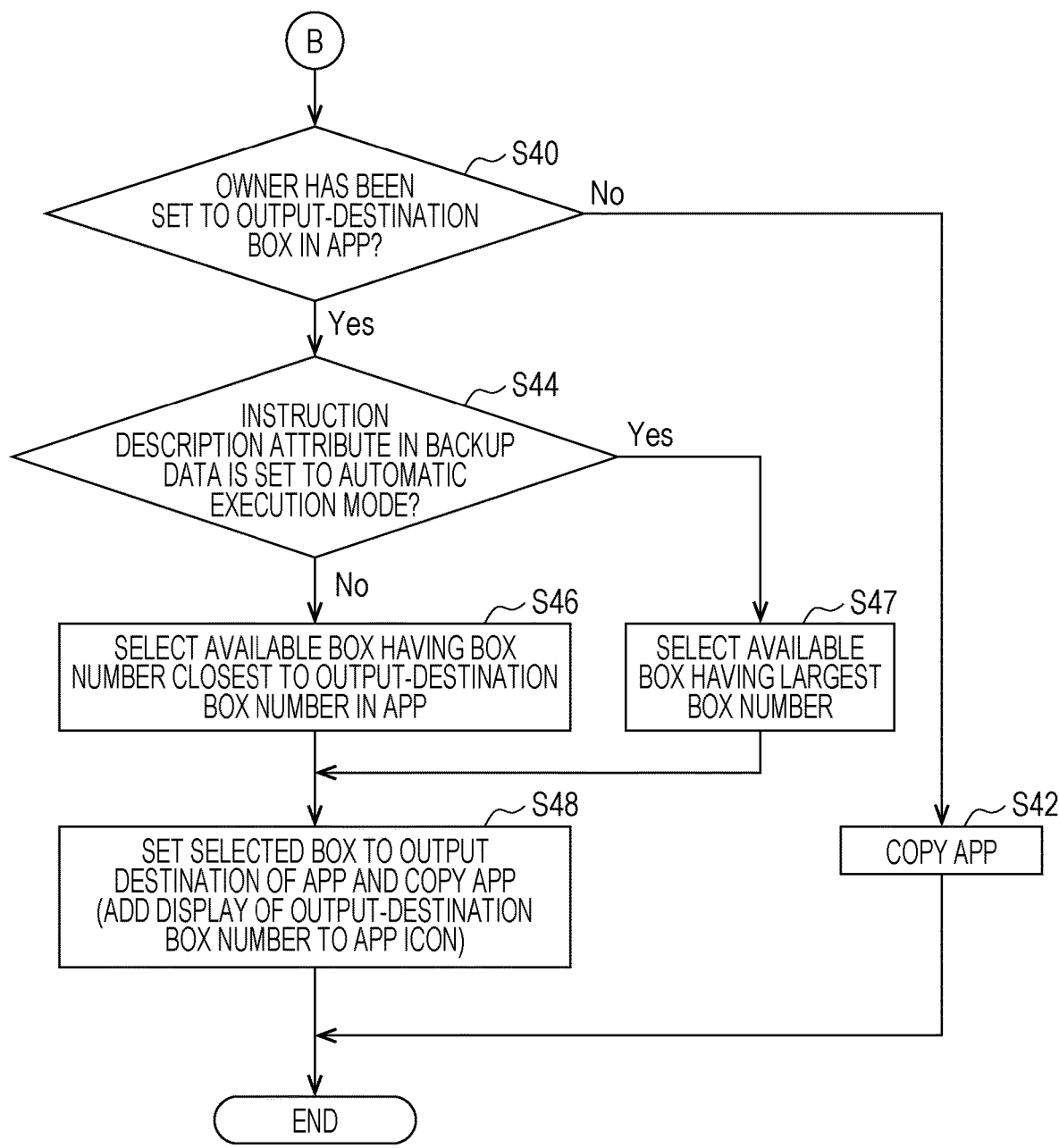
FIG. 8 is a diagram illustrating another part of an exemplary procedure of an app copying unit in an apparatus according to the exemplary embodiment.

Referring to FIGS. 6 to 8, an exemplary procedure performed by the app copying unit 124 will be described.

According to the procedure in FIG. 5, a user obtains a backup data file, in the user's client PC 200, of a one-touch app 136 in a certain apparatus 100. Then, the user accesses the client UI unit 126 of a different apparatus 100 which serves as a copy destination. The client UI unit 126 provides a menu screen to the client PC 200. The menu screen includes, as a menu item, "Copy a backed-up one-touch app". When the user gives an instruction to execute the menu item, the procedure illustrated in FIGS. 6 to 8 is performed.

In this case, as illustrated in FIG. 6, the client UI unit 126 provides, to the client PC 200, a screen for receiving selection of backup data that is to be copied (S20). The user inputs one file, which is selected from the backup data files stored in the client PC 200, in the input field on the screen displayed on the client PC 200. The client PC 200 transmits the selected backup data file to the client UI unit 126.

The app copying unit 124 of the apparatus 100 receives the backup data file from the client UI unit 126, and analyzes the data of the file (S22).

The app copying unit 124 uses the analysis result to determine whether or not it is possible to perform user identification between the copy-source apparatus 100 (that is, the apparatus 100 having generated the backup data) and the apparatus 100 thereof (S23). This determination is performed, for example, by comparing the ID of the authentication system 250 used by the apparatus 100 in user authentication with the ID of the authentication system included in the backup data. If both the authentication system IDs match each other, the apparatus 100 and the copy-source apparatus 100 use the same authentication system. If the user IDs in the apparatus 100 and the copy-source apparatus 100 are the same, the users indicated by the user IDs are the same. In this case, the determination result in S23 is Yes. In contrast, if the authentication system IDs do not match each other, the same user IDs do not necessarily indicate the same user. In this case, the determination result in S23 is No, and the process proceeds to the process in FIG. 8 (described below in detail).

If the determination result in S23 is Yes, the app copying unit 124 checks whether or not data about the processing content of the one-touch app 136 in the backup data includes the box number of the output-destination box 132 for the processing result data of the one-touch app 136. If the box number is not included, an output-destination box 132 for the processing result is not set in the one-touch app 136 in the backup data. This indicates the case in which the output destination for the processing result is, not a box 132, for example, print output or a FAX transmission-destination number. In this case, there will not arise a problem caused by a different owner of the box 132 of the same number as that of the copy source. The present exemplary embodiment is not applied to this case, and the process in FIGS. 6 to 8 is not applied. In this case, the app copying unit 124 may simply copy the one-touch app 136 in the backup data to the apparatus 100 thereof.

If data about the processing content of the one-touch app 136 in the backup data includes the box number of the output-destination box 132 for the processing result data of the one-touch app 136, the app copying unit 124 performs the following processes. That is, the app copying unit 124 refers to the box management information 134 to determine whether or not an owner has been set in the box 132 of the box number in the apparatus 100 (hereinafter referred to as a "same-number box 132" which means a box of the same number as that of the copy-source box 132) (S24). If an owner is not set in the same-number box 132, the determination result in S24 is No. In this case, the process proceeds to the process illustrated in FIG. 7. The owner "anyone" is set to a box 132 which is set as a shared box available to anyone. A box 132, to which no owners are set, is a so-called "available" box 132 on which no registration indicating that the box 132 is used has not been performed. In the example below, the box number indicates serial numbers starting from one. The number corresponding to the maximum number of boxes 132, which may be included in the apparatus 100, is the upper limit number.

If the determination result in S24 is Yes, the app copying unit 124 compares the user ID of the owner of the same-number box 132 with the user ID in the owner attribute of the copy-source box 132 in the backup data, and determines whether or not the IDs match each other (S26). If the determination result is No, the process proceeds to the process illustrated in FIG. 7.

If the determination result in S26 is Yes, the app copying unit 124 obtains the other required attributes of the same-number box 132 from the box management information 134, and determines whether or not the required attributes match those of the copy-source box 132 in the backup data (S28). In the box management information 134 illustrated in FIG. 3, the instruction description and the network number are required attributes. In this case, in S28, the app copying unit 124 determines whether or not both the processing content of the instruction description and the network number match between the copy-source box 132 and the same-number box 132. If the matching fails in the processing content of the instruction description, when the one-touch app 136 in the backup data is copied to the apparatus 100 and the copied app is executed, an instruction description having processing content different from that of the copy-source apparatus 100 is performed on the processing result of the one-touch app 136. If the network number does not match between the copy-source box 132 and the same-number box 132, the same-number box 132 may be accessed from a network through which the copy-source box 132 is not accessed. This state is not desirable in view of security of the processing result data of the one-touch app 136. Therefore, in S28, it is checked whether or not the instruction description and the network number match between the copy-source box 132 and the same-number box 132. In the case where the instruction description attribute of the copy-source box 132 is "No instruction description" (that is, there are no instruction descriptions applied to the processing result which is output to the box 132), the determination result in S28 is Yes when the instruction description attribute of the same-number box 132 is also "No instruction description".

If the determination result in S28 is Yes, the app copying unit 124 copies the one-touch app 136 in the backup data as it is to the storage device 130 in the apparatus 100 (S29). The processing result obtained when the copied one-touch app 136 is executed is output to the same-number box 132. In this case, the instruction description applied to the processing result stored in the same-number box 132 and the network through which the box may be accessed are the same as those in the case of the copy-source box 132. As another example, in S28, it may be determined whether or not matching succeeds in all of the attributes including attribute which are not required attributes.

If the determination result in S28 is No, the app copying unit 124 causes the process to proceed to the process illustrated in FIG. 7.

In the procedure in FIG. 7, the app copying unit 124 searches the box management information 134 for boxes, in which the user ID in the owner attribute of the copy-source box in the backup data is set as the owner, in the apparatus 100 (S30). The app copying unit 124 determines whether or not one or more boxes 132 satisfying the condition have been found (S32). If the determination result is No, the process proceeds to the process in FIG. 8.

If the determination result in S32 is Yes, the app copying unit 124 searches among the boxes 132, which are found in S30, for a box 132 whose required attributes match those of the copy-source box in the backup data, and determines whether or not such a box 132 has been found (S34). If the determination result in S34 is No, the process proceeds to the process illustrated in FIG. 8.

If the determination result in S34 is Yes, the app copying unit 124 specifies, among the boxes 132 found in S34, a box 132 having the largest number of attribute items, which have the same values as those of the copy-source box in the backup data, among all of the attribute items including those other than the required attributes. The app copying unit 124 changes the setting of the box number of the output-destination box 132 for the processing result of the one-touch app 136 in the backup data, to the box number of the specified box 132 (S36). The app copying unit 124 copies the one-touch app 136, whose settings have been thus changed, to the storage device 130 (S38).

The data in the one-touch app 136 includes, in addition to information indicating the processing content of the app, data defining an icon 410, which is displayed on a UI screen, of the app. The box number of the output-destination box 132 for the processing result of the one-touch app 136 copied in S38 is different from the box number of the copy-source box. In addition, since the box number is selected by the app copying unit 124 automatically, a user does not recognize the number. Therefore, the app copying unit 124 adds display of the box number of the box 132, which is set as the output destination in S36, to the icon 410 of the one-touch app 136 which is copied in S38. Thus, a user views the icon 410 of the one-touch app 136 which is displayed on the UI screen 400 of the apparatus 100. Accordingly, the user recognizes the number of the box in which the processing result obtained when the one-touch app 136 is executed is stored.

If the determination result in S23, S32, or S34 is No, the app copying unit 124 performs the process illustrated in FIG. 8. That is, the app copying unit 124 refers to the box management information 134 to determine whether or not an owner has been set to the same-number box 132 of the apparatus 100 (S40). If the determination result is No, the same-number box 132 is an available box. In this case, the app copying unit 124 copies the one-touch app 136 in the backup data to the storage device 130 (S42). At that time, when the instruction description attribute of the copy-source box 132 included in the backup data includes identification information of instruction description, the app copying unit 124 may obtain the instruction description corresponding to the identification information from the copy-source apparatus 100, and may associate the obtained identification information with the same-number box 132.

If the determination result in S40 is Yes, an owner different from that of the copy-source box 132 is set to the same-number box 132. In this case, if the output destination of the processing result of the copied one-touch app 136 is set to the same-number box 132, the problem described above arises. Therefore, the app copying unit 124 selects, among the available boxes in the apparatus 100, a box that serves as the output destination of the processing result which is set to the one-touch app 136 in the backup data.

To make this selection, the app copying unit 124 determines whether or not the attribute item about the instruction description in the backup data is set to the automatic execution mode (S44).

In the case where no instruction descriptions are associated with the copy-source box 132, or in the case where, even if an instruction description is associated with the copy-source box 132, the association is not in the automatic execution mode, the determination result in S44 is No. In this case, the processing result of the copied one-touch app 136 is stored in any of the boxes 132. A user, who has given an instruction to execute the one-touch app 136, opens the box 132 in which the processing result is stored, and gives an instruction to perform another process on the processing result. To open the box 132, the user needs to open a box list screen (not illustrated), in which a list of the icons for the boxes 132 is displayed, on the UI screen of the apparatus 100, and needs to specify the box 132 on the list screen. Since there are over several hundred box numbers in the apparatus 100 such as a multi-function device, it is not possible to display the icons for all the boxes 132 in a single screen. To find the desired box 132 on the list screen, it may be necessary to scroll the screen many times.

Accordingly, if the determination result in S44 is No, the screen scroll operations for finding the box 132, in which the processing result is stored, are to be performed as few as possible. That is, in this case, the app copying unit 124 selects, among the available boxes 132 in the apparatus 100, a box having the box number closest to the output-destination box number which is set to the one-touch app 136 in the backup data (S46). The app copying unit 124 changes the setting of the box number of the output-destination box 132 for the processing result of the one-touch app 136 in the backup data, to the box number of the box 132 selected in S46. The app copying unit 124 copies the one-touch app 136, whose settings have been thus changed, to the storage device 130 (S48). At that time, the app copying unit 124 adds display of the box number of the box 132, which is set as the output destination, to the icon 410 for the one-touch app 136 which is copied in S48.

Through the processes in S46 and S48, a box whose number is close to that of the output-destination box 132 in the copy-source apparatus 100 is selected as the output destination of the processing result of the one-touch app 136 that is to be copied. Thus, the user may use the one-touch app 136 also in the apparatus 100 with their feeling similar to that obtained when the user used the one-touch app 136 in the copy-source apparatus 100 (that is, the amount of the operation of scrolling the box list screen to open the output-destination box 132 is almost the same as that required in the case of the copy-source apparatus 100).

If the determination result in S44 is Yes, an instruction description is associated with the copy-source box 132 in the automatic execution mode. Therefore, in order that a user may use the one-touch app 136, which is copied to the apparatus 100, with their feeling similar to that obtained in the case of the copy-source apparatus 100, it is desirable to associate the same instruction description with the box 132, which serves as the output destination of the one-touch app 136, in the apparatus 100 in the automatic execution mode. When an instruction description is associated with the box 132 in the automatic execution mode, data is stored in the box 132 so that the instruction description is applied to the data. Thus, it is less likely that the user opens the box 132 and operates the inside data manually.

Therefore, if the determination result in S44 is Yes, the app copying unit 124 refers to the box management information 134 to select a box whose box number is the largest among the available boxes (S47). Then, the app copying unit 124 changes the setting of the box number of the output-destination box 132 for the processing result of the one-touch app 136 in the backup data, to the box number of the box 132 selected in S47. The app copying unit 124 copies the one-touch app 136, whose settings have been thus changed, to the storage device 130 (S48). At that time, the app copying unit 124 obtains the instruction description, which is associated with the copy-source box 132, from the copy-source apparatus 100, and associates the instruction description with the box 132, which is selected in S47, in the automatic execution mode. In addition, the app copying unit 124 adds display of the box number of the box 132, which is set as the output destination, to the icon 410 for the one-touch app 136 which is copied in S48.

In the box list screen, the boxes 132 are displayed typically in the ascending order of the box number. Thus, a box having a larger box number needs more screen scroll operations. However, a box 132 associated with an instruction description in the automatic execution mode is less likely to be opened manually. Thus, time and labor of such scroll operations are not necessarily taken into account. A box having a larger box number is preferentially selected, as in S47, as a box 132 associated with an instruction description in the automatic execution mode. Thus, available boxes having smaller box numbers remain. The remaining available boxes need fewer scroll operations for opening the boxes manually.

In the procedure in FIGS. 6 to 8 described above, a box 132, to which an owner different from the owner of the copy-source box 132 is set, is not selected as the output destination of the processing result of the one-touch app 136 that is to be copied. Only when there are no boxes 132, in the apparatus 100, whose owners are the same as that of the copy-source box 132 (that is, the determination result in S23 or S32 is No), an available box 132 is selected as the output destination of the processing result of the one-touch app 136 that is to be copied. This indicates that a box 132, whose owner is the same as that of the copy-source box 132 and which is included in the apparatus 100, is selected in preference to a box 132, which does not satisfy the condition described above and which is included in the apparatus 100, as the output destination of the processing result of the copied one-touch app 136. The expression, "a box 132 which does not satisfy the condition described above" indicates an available box 132 and a box 132 having a different owner.

The "preferential" selection of a box 132 satisfying a first condition indicates that, when there are multiple boxes 132 between which the conditions other than the first condition match, a box 132 satisfying the first condition is selected among the multiple boxes 132.

First Modified Example

An example in the case where there is a shared box among the multiple boxes 132 in an apparatus 100 will be described.

A shared box is a box for which users, who are capable of storing data, are not limited. Any user who uses the apparatus 100 may store data in a shared box. There are the following cases in management of access rights to data stored in a shared box: the case in which anyone may access the shared box; the case in which only specific users may access the shared box. An example of the latter case is the following utilization: for example, a shared box, which may be accessed only by a manager of a specific task, is prepared; each user, who is in charge of the task, scans documents for the task, and stores the scanned documents in the shared box, thus submitting the documents to the manager.

In this modified example, the processes, which are performed by the app copying unit 124 after the determination result in S23, S32, or S34 is No, are different from those in the case of the exemplary embodiment described above (that is, the procedure in FIG. 8).

Figure 9:
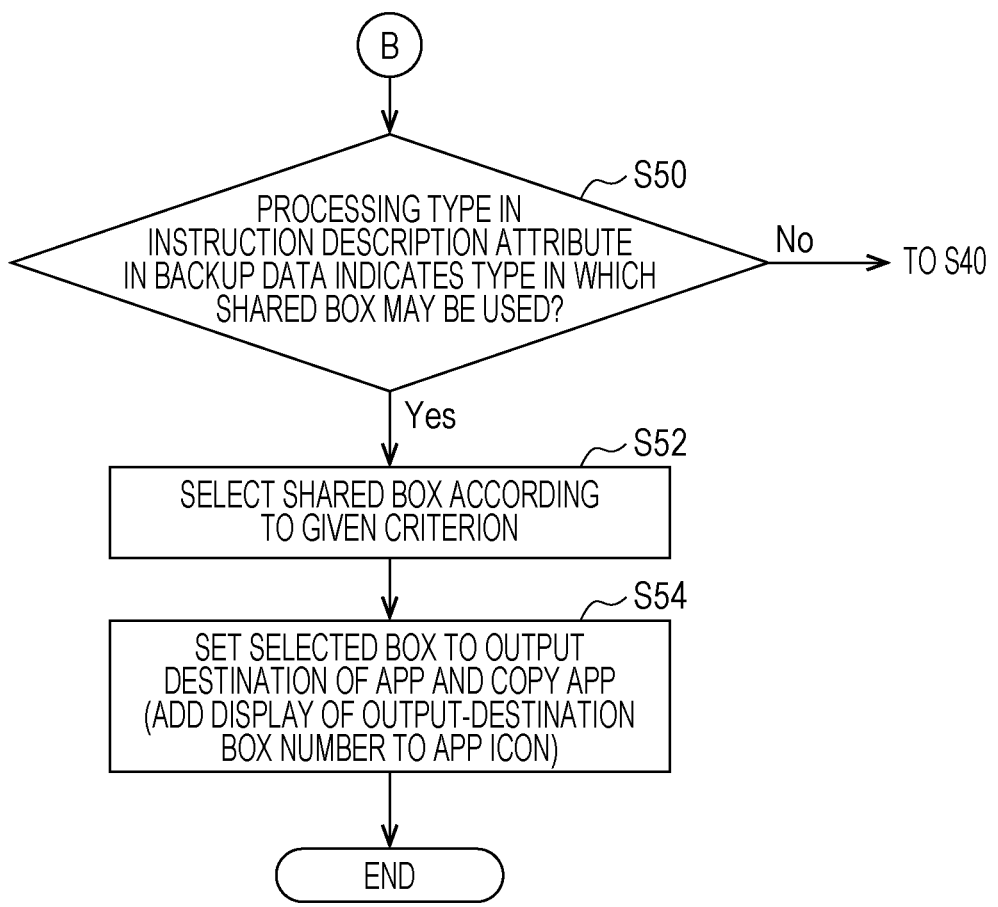
FIG. 9 is a diagram illustrating a part of an exemplary procedure of a backup generating unit in an apparatus according to a first modified example.

If the determination result in S23, S32, or S34 is No, as illustrated in FIG. 9, the app copying unit 124 determines whether or not the attribute item, indicating the processing type of the instruction description in the backup data, includes a value indicating the type in which a shared box may be used (S50). Examples of the processing content of such a type include data transfer to a location which may be accessed by anyone. Another example of the type is data transfer to a location which may be accessed only by a manager who is registered as an access right holder for any of the shared boxes in the apparatus 100, or data transfer to the communication address or the like (for example, the mail address) of the manager.

To generate backup data including this type of information, the backup generating unit 122 of a copy-source apparatus 100 performs the following processes. That is, when a box 132 is assigned as the output destination of the processing result of a one-touch app 136 that is to be backed up and when an instruction description is associated with the box 132, the backup generating unit 122 analyzes the processing content of the instruction description. If the processing content indicates data transfer using various protocols, the backup generating unit 122 obtains information about the transfer destination location, the address, and the like from the instruction description and the like. If the transfer destination is located on a network, the backup generating unit 122 obtains information about a user, who has access rights to the location, from the system managing the location. At that time, if the location may be accessed by anyone, the backup generating unit 122 obtains information indicating that anyone may access the location. The information about a user, who has access rights to the transfer destination location, and information about the address of the transfer destination, which are thus obtained, are information for determining a transfer-destination user to whom the transfer is performed. An example of this information is information indicating that "anyone may access the location".

If the processing content of the instruction description indicates data transfer, the backup generating unit 122 includes the attribute item, indicating the processing type "Transfer", and the attribute item, indicating information for determining the transfer-destination user, in the backup data.

The app copying unit 124 of a copy-destination apparatus 100 refers to the values of these attribute items in the backup data, and performs the determination in S50. That is, if the processing type indicates a type other than "Transfer", the determination result in S50 is No. Even if the processing type indicates "Transfer", when the information for determining the transfer-destination user does not correspond to the access right holder of any of the shared boxes in the apparatus 100, the determination result in S50 is No. The determination result in S50 is Yes if the processing type indicates "Transfer" and if the information for determining the transfer-destination user corresponds to the access right holder of any of the shared boxes in the apparatus 100. For example, if the information for determining the transfer-destination user is "may be accessed by anyone" and if there is a shared box, in which the data may be accessed by anyone, in the apparatus 100, the determination result in S50 is Yes.

If the determination result in S50 is No, the app copying unit 124 performs the processes in S40 and its subsequent steps in FIG. 8.

If the determination result in S50 is Yes, the app copying unit 124 selects a shared box which serves as the output destination of the processing result of the one-touch app 136 in the backup data (S52). In S52, if the information for determining the transfer-destination user in the backup data indicates "may be accessed by anyone", a shared box is selected from the shared boxes, satisfying the condition that "may be accessed by anyone" is set, as the output destination. Alternatively, if the information for determining the transfer-destination user indicates a specific user's ID or address, a shared box is selected from the shared boxes, satisfying the condition that the specific user is set as an access right holder, as the output destination.

In S52, when there are multiple shared boxes satisfying the condition, the app copying unit 124 selects one from the shared boxes as the output destination according to a certain criterion. An example of this criterion is a criterion similar to that in the process in S36 in FIG. 7, that is, a criterion in which a box, whose number of attribute items matching those of the copy-source box is the largest, is selected. Another example of the criterion is a criterion in which a box, whose number of pieces of stored data (for example, files) is the smallest, is selected. According to the criterion, a shared box, whose available space is large, is easily selected. Another example of the criterion is a criterion in which a box whose usage frequency is the lowest (that is, a box whose number of data input/output operations performed by users is the smallest) is selected. This criterion causes a shared box, whose access load from users is light, to be easily selected.

After S52, the app copying unit 124 changes the setting of the box number of the output-destination box 132 for the processing result of the one-touch app 136 in the backup data, to the box number of the box 132 selected in S52. The app copying unit 124 copies the one-touch app 136, whose settings have been thus changed, to the storage device 130 (S54). At that time, the app copying unit 124 adds display of the box number of the box 132, which is set to the output destination, to the icon 410 of the one-touch app 136 copied in S54.

Second Modified Example

In the exemplary embodiment described above, when the number of the box serving as the output destination of the one-touch app 136 in a copy-destination apparatus 100 is changed from the number in a copy-source apparatus, the app copying unit 124 displays the changed box number on the icon of the copied one-touch app 136.

In addition to this method, a method for reducing erroneous user operations in the case where the output-destination box number of the one-touch app 136 is changed will be described below.

(1) In a first method, the box number before the change is linked to the box number after the change. This method is such that, in the apparatus 100, the app copying unit 124 sets the box number after the change, as the attribute, for the box 132 of the box number (that is, the box number before the change) which is set as the output destination of the processing result of the one-touch app 136 in the backup data. In addition, in association with the attribute, the app copying unit 124 sets the attribute, which indicates the user ID of a user who has copied the backup data, for the box 132.

When the controller 120 of the apparatus 100 receives a user operation of opening the box 132 for which the attribute of the box number after the change is set, the controller 120 determines whether or not the user corresponds to the user ID attribute corresponding to the attribute. If the determination result is Yes, the controller 120 opens the box 132 indicated by the attribute of the box number after the change, not the box 132 of the box number before the change. If the determination result is No, the controller 120 opens the box 132 on which the user has performed the open operation.

(2) In a second method, every time a one-touch app 136 is executed in response to a user's instruction, the controller 120 records the execution date and time, the user ID, and the number of the box serving as the output destination to which the processing result is output in the execution. That is, the user's execution history of one-touch apps 136 is recorded. In the recorded execution history, information (for example, the name) for specifying an executed one-touch app 136 may be further recorded.

In response to a request from the user, the controller 120 provides a screen on which a list of the user's execution history records for the one-touch apps 136 is displayed. From the list on the screen, the user specifies and selects the execution history record corresponding to a processing result of a one-touch app 136, which the user wants to view, from the information about the date and time and the like. The controller 120 opens the box 132 having the box number included in the execution history record selected by the user, and displays a list of pieces of data in the box 132. The user selects a piece of data, which is to be viewed or is subjected to another operation, from the list.

In a given period from the time point at which a one-touch app 136 is copied in response to an instruction from a user, the controller 120 records a list of execution history records and receives the user's selection on the list, as described above. The given period has a time length in which the user is assumed to need to get used to the change of the number of the output-destination box 132 for the processing result of the one-touch app 136.

Third Modified Example

In the exemplary embodiment and the modified examples described above, the controller 120 of an apparatus 100 exerts control for copying a one-touch app 136 between apparatuses 100. This is just exemplary. As another example, the client PC 200 operated by a user may exert control for copying a one-touch app 136.

Figure 10:
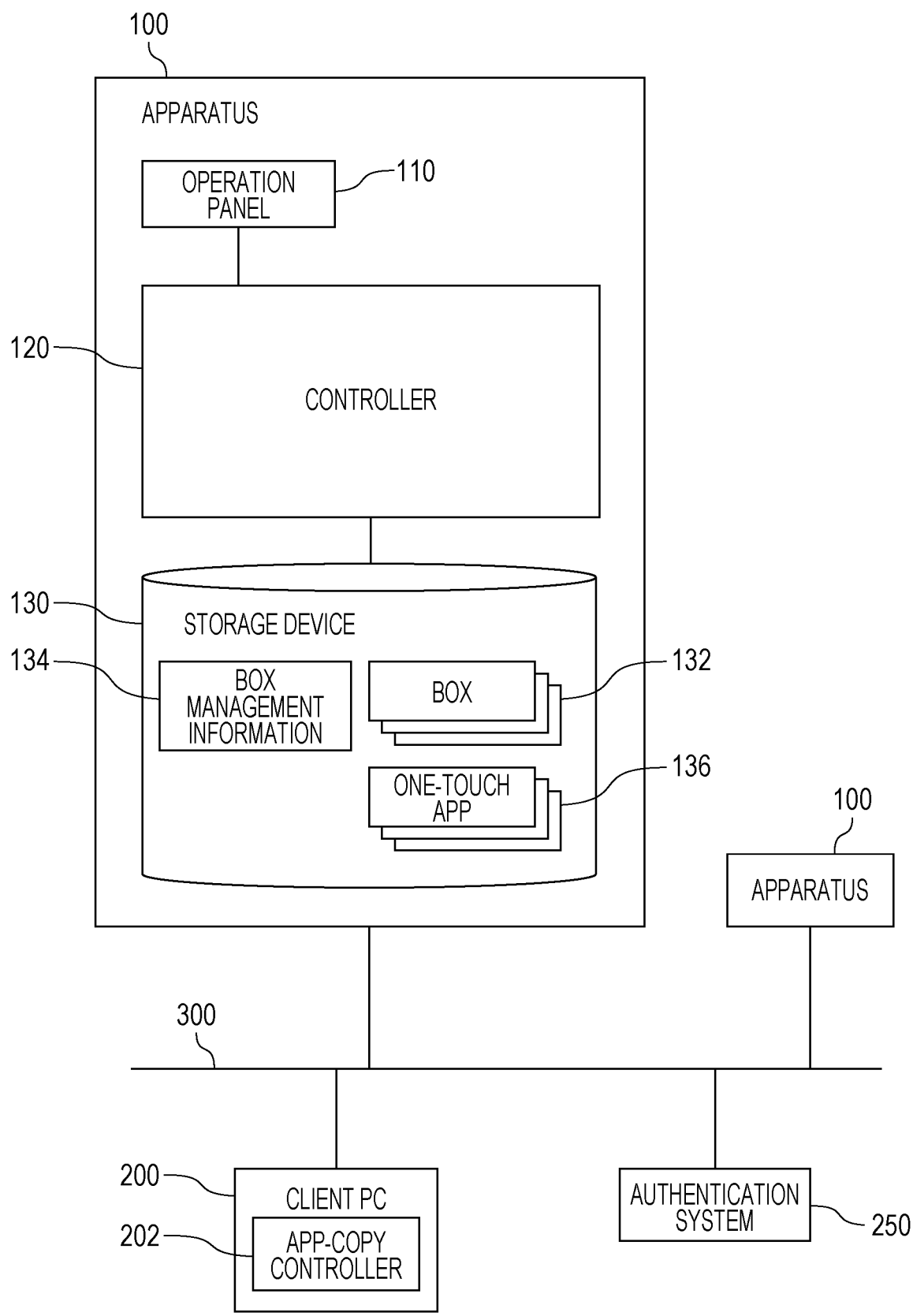
FIG. 10 is a diagram illustrating an exemplary system according to a third modified example.

In the third modified example, as illustrated in FIG. 10, an app-copy controller 202 in the client PC 200 exerts control for copying a one-touch app 136 between apparatuses 100.

Figure 11:
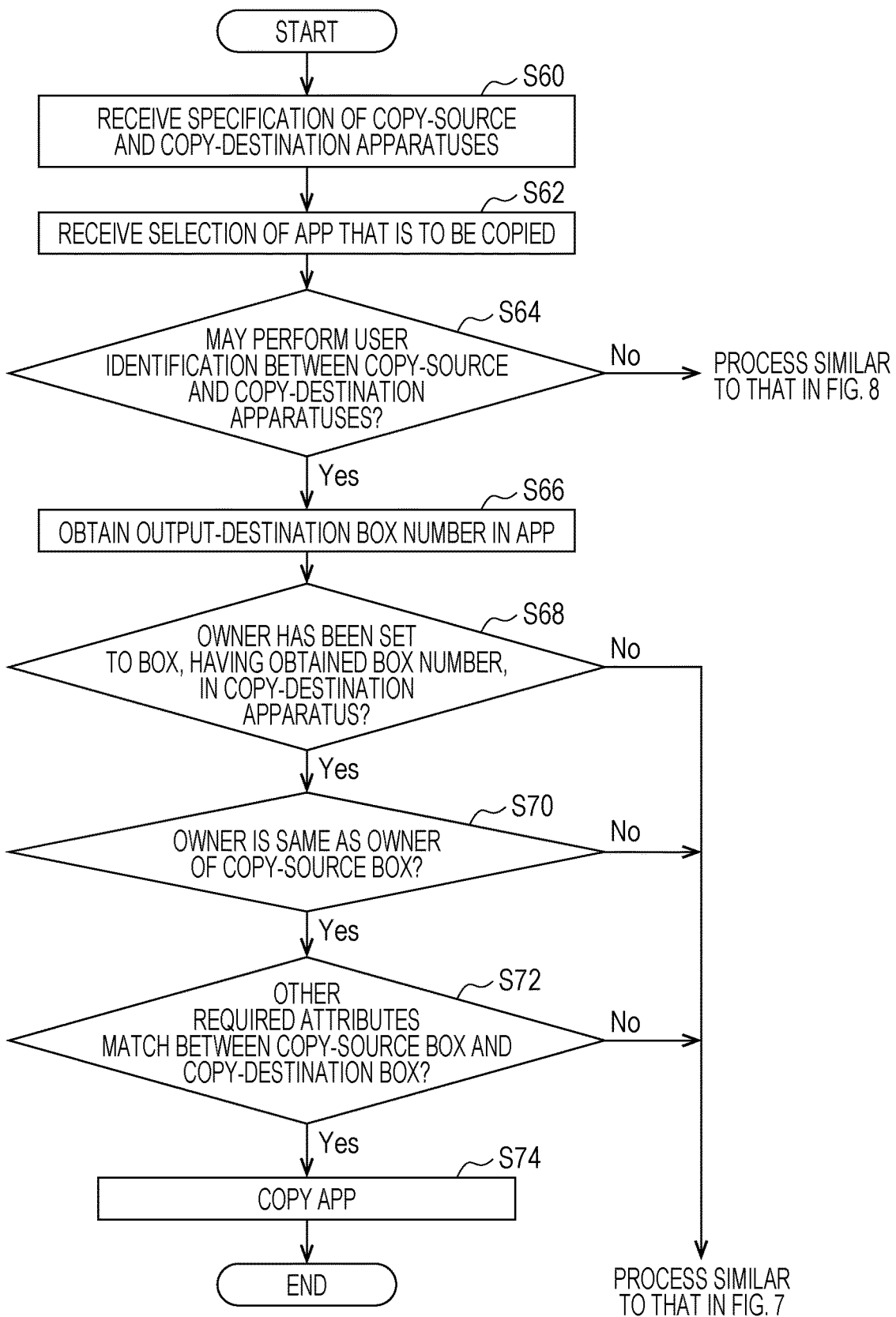
FIG. 11 is a diagram illustrating a part of an exemplary procedure of an app-copy controller according to the third modified example.

FIG. 11 illustrates a part of the procedure of the app-copy controller 202. In the procedure illustrated in FIG. 11, when a user operates the client PC 200 to start up the app-copy controller 202, the app-copy controller 202 receives specification of copy-source and copy-destination apparatuses (S60). In this step, for example, the app-copy controller 202 provides a screen on which a list of the apparatuses 100 on the network 300 is displayed, and receives selection of a copy-source apparatus 100 and a copy-destination apparatus 100 on the screen.

Then, the app-copy controller 202 accesses the controller 120 of the specified copy-source apparatus 100, and obtains a list of the one-touch apps 136 in the apparatus 100 from the controller 120 for display. The user selects, from the list, a one-touch app 136 that is to be copied. The app-copy controller 202 receives the selection result (S62).

The app-copy controller 202 determines whether or not it is possible to perform user identification between the copy-source apparatus 100 and the copy-destination apparatus 100 (S64). The determination may be performed in a similar way to S23 in FIG. 6.

The processes of the app-copy controller 202 after that may be performed similarly to those of the app copying unit 124 according to the exemplary embodiment and the like described above, except that, instead of the backup data, the one-touch app 136, which is to be copied, in the copy-source apparatus 100 and the box management information 134 are referred to.

For example, if the determination result in S64 is Yes, the app-copy controller 202 obtains, from the copy-source apparatus 100, the box number of the output-destination box 132 for the processing result data of the one-touch app 136 (S66). The app-copy controller 202 refers to the box management information 134 to determine whether or not an owner is set to the box 132 (that is, the "same-number box 132") having the box number in the copy-destination apparatus 100 (S68).

If the determination result in S68 is Yes, the app-copy controller 202 compares the user ID of the owner of the same-number box 132 with the user ID of the owner attribute of the copy-source box 132, and determines whether or not both IDs match each other (S70).

If the determination result in S70 is Yes, the app-copy controller 202 determines whether or not the required attributes match between the copy-source box 132 and the same-number box 132 (S72). If the determination result in S72 is Yes, the app-copy controller 202 copies the one-touch app 136, which is to be copied, as it is to the copy-source storage device 130 (S74).

If the determination result in S64 is No, the app-copy controller 202 performs processes similar to those in FIG. 8. If the determination result in S68, S70, or S72 is No, the app-copy controller 202 performs processes similar to those in FIG. 7. The unit executing the processes in the case of the processes in FIG. 7 is different from that in FIG. 8. However, the processing content itself is almost similar. Those skilled in the art may understand the processes clearly. Thus, these processes will not be described.

The apparatus 100 may have the functions of the app-copy controller 202.

The information processing mechanism of the apparatus 100 and the client PC 200 according to the exemplary embodiment and the modified examples described above are implemented by causing a computer to execute programs describing the above-described functions of the components included in the apparatus 100 or the client PC 200. For example, as hardware, the computer has a circuit configuration in which a processor, memories (primary memories), such as a random-access memory (RAM) and a read-only memory (ROM), a controller for controlling fixed storage devices, such as a flash memory, a solid state drive (SSD), and a hardware disk drive (HDD), various input/output (I/O) interfaces, a network interface for exerting control for establishing a connection with a network such as a local area network, and the like are connected, for example, through a bus. Programs describing the processing content of the functions are stored in a fixed storage device such as a flash memory over a network or the like, and are installed in the computer. The programs stored in the fixed storage device are read into the RAM, and are executed by the processor. Thus, the functional modules described above as an example are implemented.

The processor indicates a processor in a broad sense, and includes general-purpose processors (for example, a central processing unit (CPU)) and dedicated processors (for example, a graphics processing unit (GPU), an application specific integrated circuit (ASIC), a field programmable gate array (FPGA), and a programmable logic device).

Operations of the processor according to the exemplary embodiment and the modified examples described above may be performed, not only by a single processor, but also through collaboration between multiple processors located at physically distant positions. In addition, the order of execution of the operations of the processor (that is, the operations of the components in FIG. 1 which are implemented through operation of the processor) is not limited only to the order described in the exemplary embodiment and the modified examples described above, and may be changed appropriately.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An apparatus comprising:
    a generating unit that generates backup data including an information processing component, identification information of a save area among a plurality of save areas in the apparatus, and associated-user information, the information processing component being included in the apparatus, the save area being associated with the information processing component, the associated-user information indicating a user associated with the save area; and
    a copy unit that, if second backup data generated by the generating unit of a different apparatus is received, copies the information processing component in the second backup data to the apparatus, and, if a user is associated with a save area which is among the plurality of save areas in the apparatus and which is indicated by the identification information included in the second backup data, associates a save area with the information processing component copied in the apparatus, the associated save area being among the plurality of save areas in the apparatus and being specified on a basis of the associated-user information included in the second backup data.

2. The apparatus according to claim 1,
wherein the copy unit associates a save area with the copied information processing component in such a manner that a save area, which is associated with the user indicated by the associated-user information, has a higher preference than a save area, which is not associated with the user indicated by the associated-user information, the save areas being among the plurality of save areas in the apparatus, the copied information processing component being copied to the apparatus.

3. The apparatus according to claim 2,
wherein, if, among the plurality of save areas in the apparatus, there are a plurality of user-associated save areas associated with the user indicated by the associated-user information, the copy unit more preferentially associates a save area with the information processing component copied to the apparatus, the associated save area being among the plurality of user-associated save areas and having a larger number of attributes matching attributes of a save area which is included in the different apparatus and which is indicated by the identification information included in the second backup data.

4. The apparatus according to claim 3,
wherein, among the plurality of user-associated save areas which are included in the apparatus and which are associated with the user indicated by the associated-user information, the copy unit associates a save area with the information processing component copied to the apparatus, the associated save area being a save area whose given required attribute matches a required attribute of the save area which is included in the different apparatus and which is indicated by the identification information included in the second backup data.

5. The apparatus according to claim 4,
wherein, if there is not a required-attribute matching save area among the plurality of user-associated save areas, the user-associated save areas being among the plurality of save areas in the apparatus and being associated with the user indicated by the associated-user information, the required-attribute matching save area having a given required attribute matching a required attribute of the save area which is included in the different apparatus and which is indicated by the identification information included in the second backup data, the copy unit specifies a save area which is among no-association save areas and which is to be associated with the information processing component copied to the apparatus, the no-association save areas having no association with users and being among the plurality of save areas in the apparatus.

6. The apparatus according to claim 3,
wherein, if there is not a required-attribute matching save area among the plurality of user-associated save areas, the user-associated save areas being among the plurality of save areas in the apparatus and being associated with the user indicated by the associated-user information, the required-attribute matching save area having a given required attribute matching a required attribute of the save area which is included in the different apparatus and which is indicated by the identification information included in the second backup data, the copy unit specifies a save area which is among no-association save areas and which is to be associated with the information processing component copied to the apparatus, the no-association save areas having no association with users and being among the plurality of save areas in the apparatus.

7. The apparatus according to claim 2,
wherein, among a plurality of user-associated save areas which are included in the apparatus and which are associated with the user indicated by the associated-user information, the copy unit associates a save area with the information processing component copied to the apparatus, the associated save area being a save area whose given required attribute matches a required attribute of a save area which is included in the different apparatus and which is indicated by the identification information included in the second backup data.

8. The apparatus according to claim 7,
wherein, if there is not a required-attribute matching save area among the plurality of user-associated save areas, the user-associated save areas being among the plurality of save areas in the apparatus and being associated with the user indicated by the associated-user information, the required-attribute matching save area having a given required attribute matching a required attribute of the save area which is included in the different apparatus and which is indicated by the identification information included in the second backup data, the copy unit specifies a save area which is among no-association save areas and which is to be associated with the information processing component copied to the apparatus, the no-association save areas having no association with users and being among the plurality of save areas in the apparatus.

9. The apparatus according to claim 7,
wherein the required attribute of the save area indicates a process performed on data stored in the save area.

10. The apparatus according to claim 9,
wherein the required attribute of the save area indicates a network which is among a plurality of networks connected to the apparatus and over which access to the save area is permitted.

11. The apparatus according to claim 7,
wherein the required attribute of the save area indicates a network which is among a plurality of networks connected to the apparatus and over which access to the save area is permitted.

12. The apparatus according to claim 2,
wherein, if there is not a required-attribute matching save area among a plurality of user-associated save areas, the user-associated save areas being among the plurality of save areas in the apparatus and being associated with the user indicated by the associated-user information, the required-attribute matching save area having a given required attribute matching a required attribute of a save area which is included in the different apparatus and which is indicated by the identification information included in the second backup data, the copy unit specifies a save area which is among no-association save areas and which is to be associated with the information processing component copied to the apparatus, the no-association save areas having no association with users and being among the plurality of save areas in the apparatus.

13. The apparatus according to claim 12,
wherein the required attribute of the save area indicates a process performed on data stored in the save area.

14. The apparatus according to claim 12,
wherein the required attribute of the save area indicates a network which is among a plurality of networks connected to the apparatus and over which access to the save area is permitted.

15. The apparatus according to claim 1,
wherein, when there is not a save area which is included in the apparatus and which is associated with the user indicated by the associated-user information, or when user identification fails to be performed between the different apparatus and the apparatus, if a save area which is in the apparatus and which is indicated by the identification information is not associated with a user, the copy unit specifies the save area as a save area which is to be associated with the information processing component copied to the apparatus.

16. The apparatus according to claim 1,
wherein, when there is not a save area which is included in the apparatus and which is associated with the user indicated by the associated-user information or when user identification fails to be performed between the different apparatus and the apparatus, if a user is associated with a save area which is included in the apparatus and which is indicated by the identification information, the copy unit specifies a save area which is among no-association save areas and which is to be associated to the information processing component copied to the apparatus, the no-association save areas having no association with users and being among the plurality of save areas in the apparatus.

17. The apparatus according to claim 1,
wherein, when there is not a save area which is included in the apparatus and which is associated with the user indicated by the associated-user information or when user identification fails to be performed between the different apparatus and the apparatus, if a transfer destination satisfies a given condition, the transfer destination being set as a transfer destination of data stored in a save area which is included in the different apparatus and which is indicated by the identification information, the copy unit specifies a save area that is to be associated with the information processing component copied to the apparatus, the specified save area being among shared save areas among the plurality of save areas in the apparatus, the shared save areas being set such that any user is capable of storing data in the shared save areas.

18. The apparatus according to claim 17,
wherein the given condition related to the transfer destination indicates that the transfer destination is a location which anyone is capable of accessing.

19. A non-transitory computer readable medium storing a program causing a computer to execute a process in an apparatus, the process comprising:

generating backup data including an information processing component, identification information of a save area among a plurality of save areas in the apparatus, and associated-user information, the information processing component being included in the apparatus, the save area being associated with the information processing component, the associated-user information indicating a user associated with the save area; and if second backup data generated by the generating unit of a different apparatus is received, copying the information processing component in the second backup data to the apparatus, and, if a user is associated with a save area which is among the plurality of save areas in the apparatus and which is indicated by the identification information included in the second backup data, associating a save area with the information processing component copied in the apparatus, the associated save area being among the plurality of save areas in the apparatus and being specified on a basis of the associated-user information included in the second backup data.

20. A non-transitory computer readable medium storing a program causing a computer to execute a process comprising:

acquiring an information processing component, identification information of a first save area, and associated-user information, the information processing component being included in a first apparatus, the first save area being associated with the information processing component and being among a plurality of save areas of the first apparatus, the associated-user information indicating a user associated with the first save area;

copying the information processing component to a second apparatus; and if a user is associated with a save area which is among a plurality of save areas in the second apparatus and which is indicated by the identification information, associating a save area with the information processing component copied to the second apparatus, the associated save area being specified on a basis of the associated-user information and being among the plurality of save areas in the second apparatus.

* * * * *